United States Patent [19]

Lacroix

[11] Patent Number: 5,137,348
[45] Date of Patent: Aug. 11, 1992

[54] COLLIMATED PROJECTION SYSTEM WITH WIDE HORIZONTAL FIELD, WITH DEVICE TO INCREASE THE VERTICAL FIELD

[75] Inventor: Michel Lacroix, Boise d'Arcy, France

[73] Assignee: Thomson-CSF, Puteaux, France

[21] Appl. No.: 685,924

[22] Filed: Apr. 16, 1991

[30] Foreign Application Priority Data

May 2, 1990 [FR] France .................. 90 05541

[51] Int. Cl.$^5$ .................. G03B 21/28; G03B 37/04
[52] U.S. Cl. .................. 353/79; 353/122; 353/30; 434/44; 434/38; 434/33; 359/451; 352/69
[58] Field of Search .................. 353/12, 11, 37, 30, 353/98, 99, 79, 122; 359/94, 443, 449, 451; 352/69; 434/38, 33, 34, 35, 40, 43, 44, 50

[56] References Cited

U.S. PATENT DOCUMENTS

| | | | |
|---|---|---|---|
| 3,709,581 | 1/1973 | McGlasson | 434/44 |
| 3,784,742 | 1/1974 | Burnham et al. | 359/451 |
| 3,785,715 | 1/1974 | Mecklenborg | 434/44 |
| 3,880,509 | 4/1975 | Herndon | 353/12 |
| 3,895,861 | 7/1975 | Herndon | 434/44 |
| 4,129,365 | 12/1978 | Aversano et al. | 353/99 |
| 4,473,355 | 9/1985 | Pongratz | 359/451 |
| 4,505,558 | 3/1985 | Albers | 353/97 |
| 4,793,687 | 12/1988 | Shenker et al. | 350/174 |

FOREIGN PATENT DOCUMENTS

| | | |
|---|---|---|
| 2106031 | 4/1972 | France . |
| 2068138 | 8/1981 | United Kingdom . |
| 2091193 | 7/1982 | United Kingdom . |
| 8101214 | 4/1981 | World Int. Prop. O. . |

OTHER PUBLICATIONS

The Aeroplane: Flight Simulation for Helicopters; 1955 pp. 847–849.
Engineering, vol. 225, No. 3, Mar. 1985, p. 9, Londres, GB; "Wide flight simulator display system".

Primary Examiner—William A. Cuchlinski, Jr.
Assistant Examiner—William C. Dowling
Attorney, Agent, or Firm—Oblon, Spivak, McClelland, Maier & Neustadt

[57] ABSTRACT

In a simulator for helicopters, the images seen are displayed through the bottom windows by means of a system collimated to infinity, including, for each side of the cockpit, a projector (15, 16), a spherical mirror (12, 13) and a screen (17, 18).

8 Claims, 4 Drawing Sheets

COLLIMATED PROJECTION SYSTEM WITH WIDE HORIZONTAL FIELD, WITH DEVICE TO INCREASE THE VERTICAL FIELD

BACKGROUND OF THE INVENTION

In flight simulators, such as helicopter flight simulators, there is a known way of obtaining a wide horizontal field (of 180° or more) by means of projection systems collimated to infinity using a spherical mirror out of axis and a screen, that is also spherical, associated with a projector. By contrast, in the vertical direction, the size of the field attains hardly 40° because of the conformation of the optic system. To enable the display of the image seen through the bottom windows of a helicopter, it is generally the practice to use a cathode-ray tube monitor with a system of display at infinity but, in this case, the field obtained through the monitor is inadequate.

SUMMARY OF THE INVENTION

An object of the present invention is a projection system for cockpit simulators, especially for helicopter simulators, having both a big horizontal field and a big vertical field, this goal being achieved without parallax errors.

In addition to the known collimated projection system with display at infinity using a spherical mirror for the display of the upper part of the vertical field, the system according to the present invention includes a projection system collimated to infinity using a spherical mirror out of axis and a lateral lower screen for the display of each of the two lower lateral parts of the vertical field.

BRIEF DESCRIPTION OF THE DRAWINGS

The present invention shall be understood more clearly from the following detailed description of an embodiment, taken as a non-restrictive example and illustrated by the appended drawings, wherein.

DETAILED DESCRIPTION OF THE INVENTION

The invention is described here below with reference to a helicopter simulator, wherein the bottom part of the cockpit has opaque zones at the center and windows on the sides, and the role of the simulator is to restore, in addition to the main wide-angle field, the image seen by the pilot as well as by the co-pilot through these bottom windows. Naturally, the invention is not restricted to the application to a helicopter simulator and may be implemented in a simulator wherein it is necessary to display images with wide horizontal and vertical fields, a substantially central part of these images being masked by the cockpit.

Figure 1:
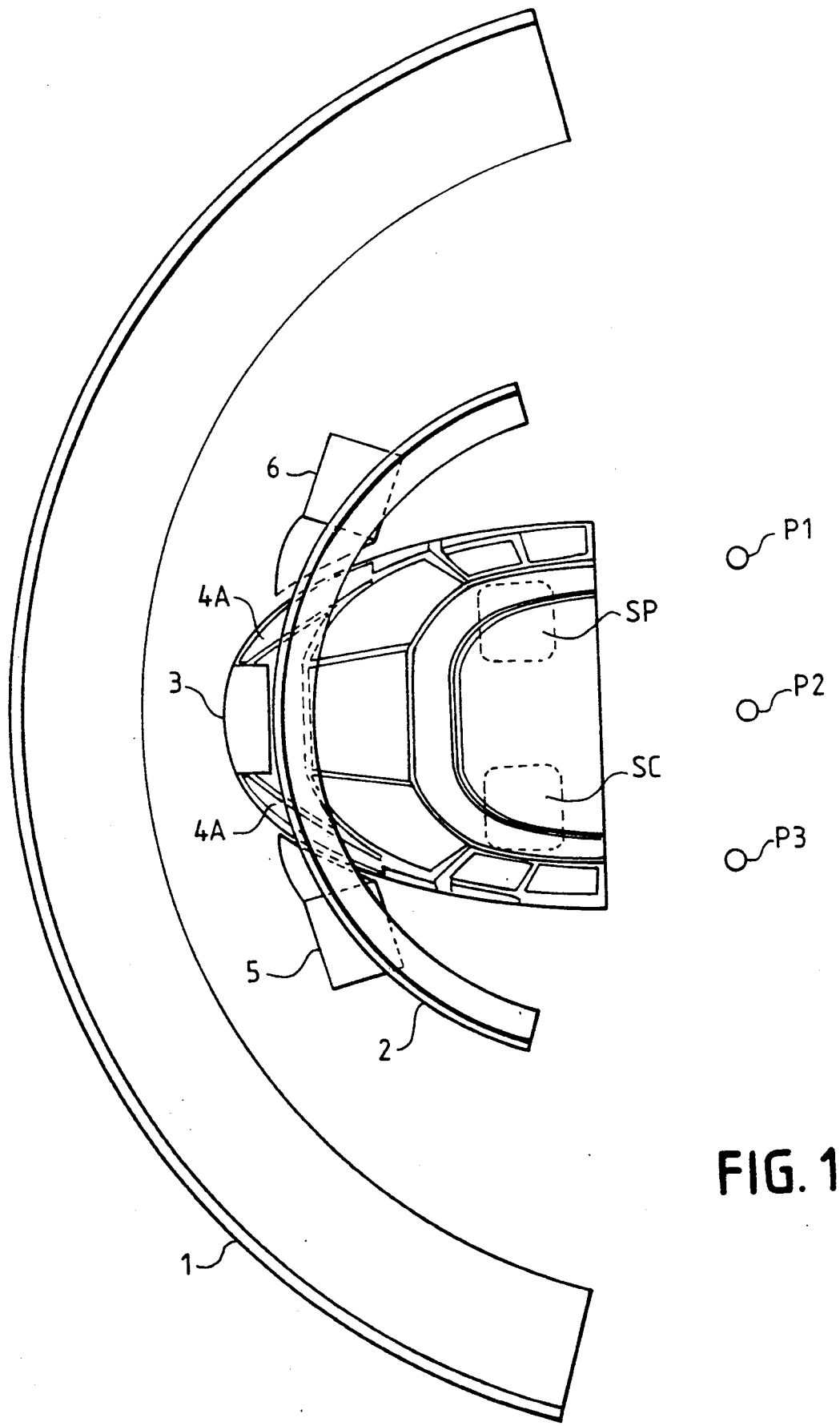
FIGS. 1 and 2 respectively show a top view and a sectional view of a known type of simulator.
Figure 2:
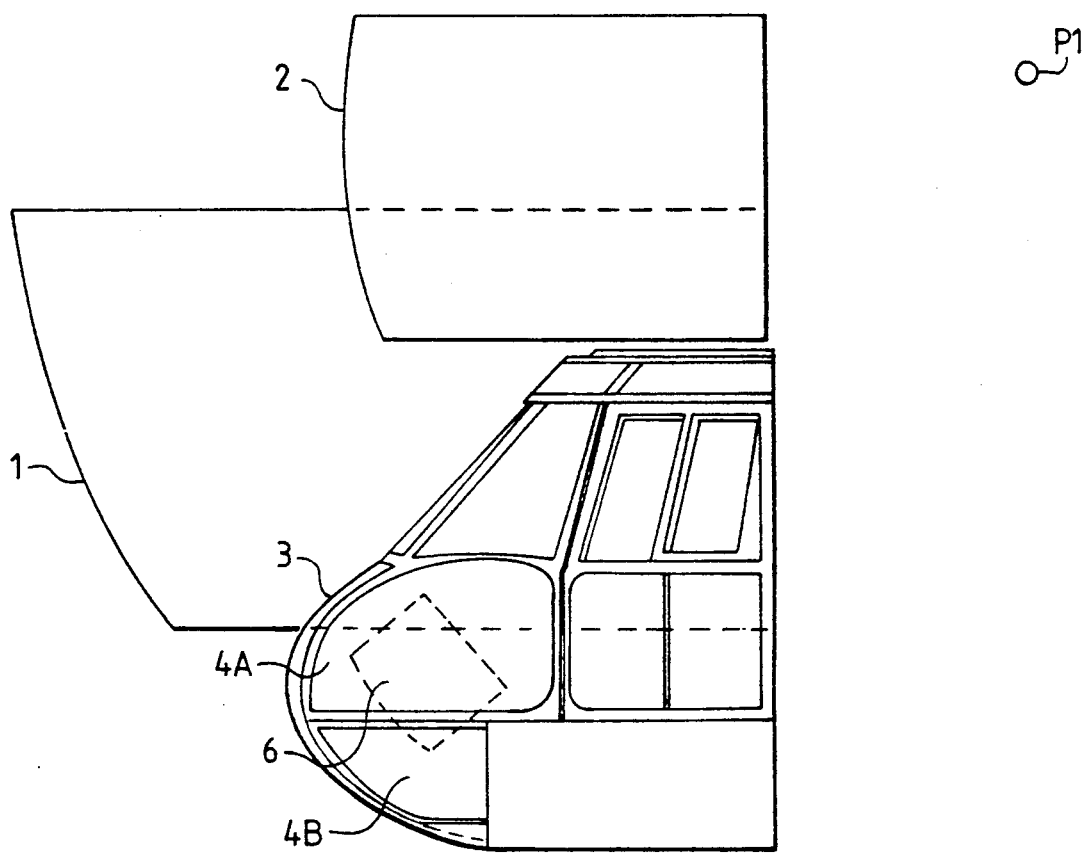

FIGS. 1 and 2 shows a schematic view of a prior art cockpit simulator with several (for example three) projectors. This simulator has a mirror 1 covering a horizontal field of about 180°. The mirror 1 is associated with a screen 2 also covering a horizontal field of about 180°. In the present example, the projection system has three projectors P1 to P3 that cooperate with the mirror 1 and the screen 2 and are located behind and on top of the observers seated in their usual places (pilot's seat SP and co-pilot's seat SC) in the cockpit 3. To display the images that have to be seen through the lateral bottom windows 4A, 4B of the cockpit, a complementary projection system is positioned in the vicinity of these bottom windows. This complementary system is referenced 5 for the left-hand bottom windows and 6 for the right-hand bottom windows. Each of these systems has a cathode-ray tube screen, a semi-transparent plate at 45° and a spherical mirror. For reasons of layout, the distance between the observer and the mirror of the corresponding complementary projection system is appreciably greater than the radius of this mirror. This means that the field of this complementary system is greatly reduced and can be used to cover only a small part of the bottom windows.

Figure 3:
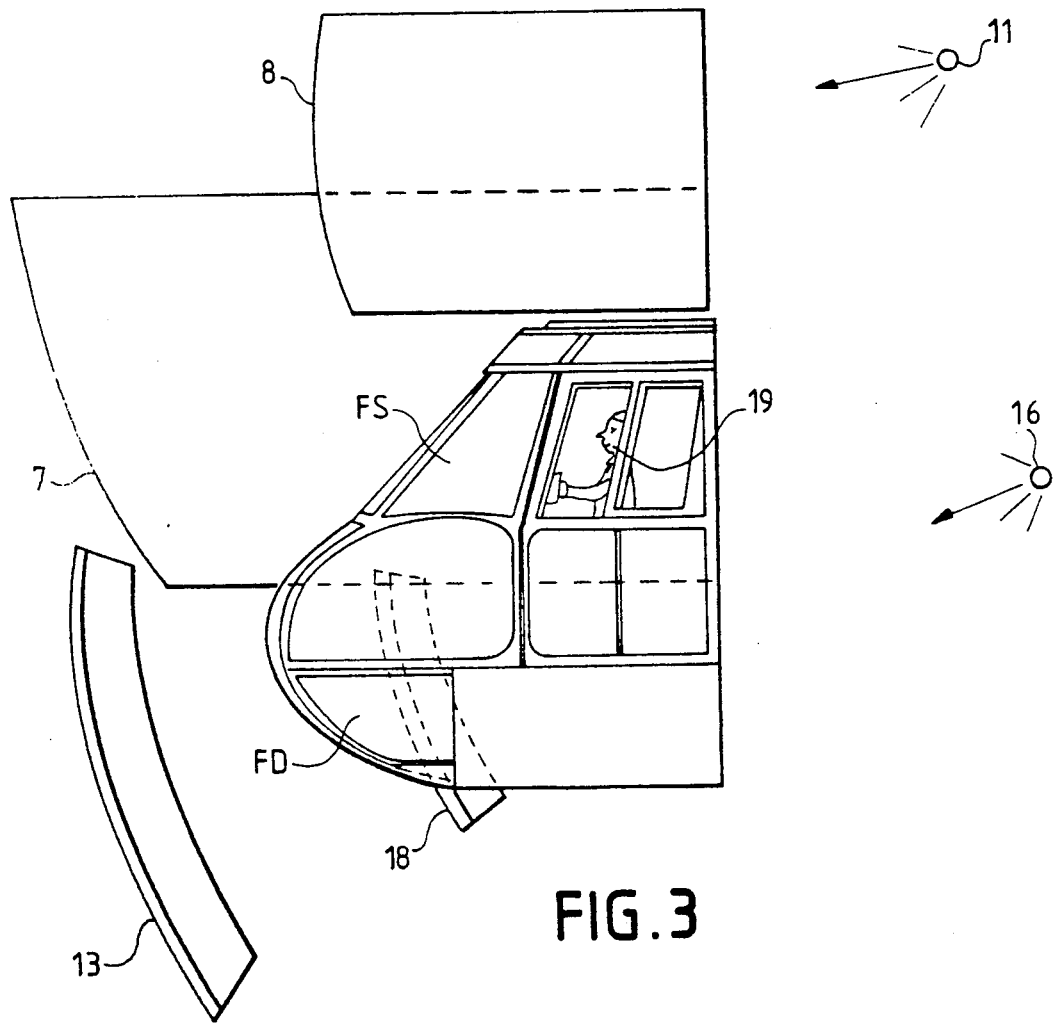
FIG. 3 shows a side, sectional view of a system according to the invention.
Figure 4:
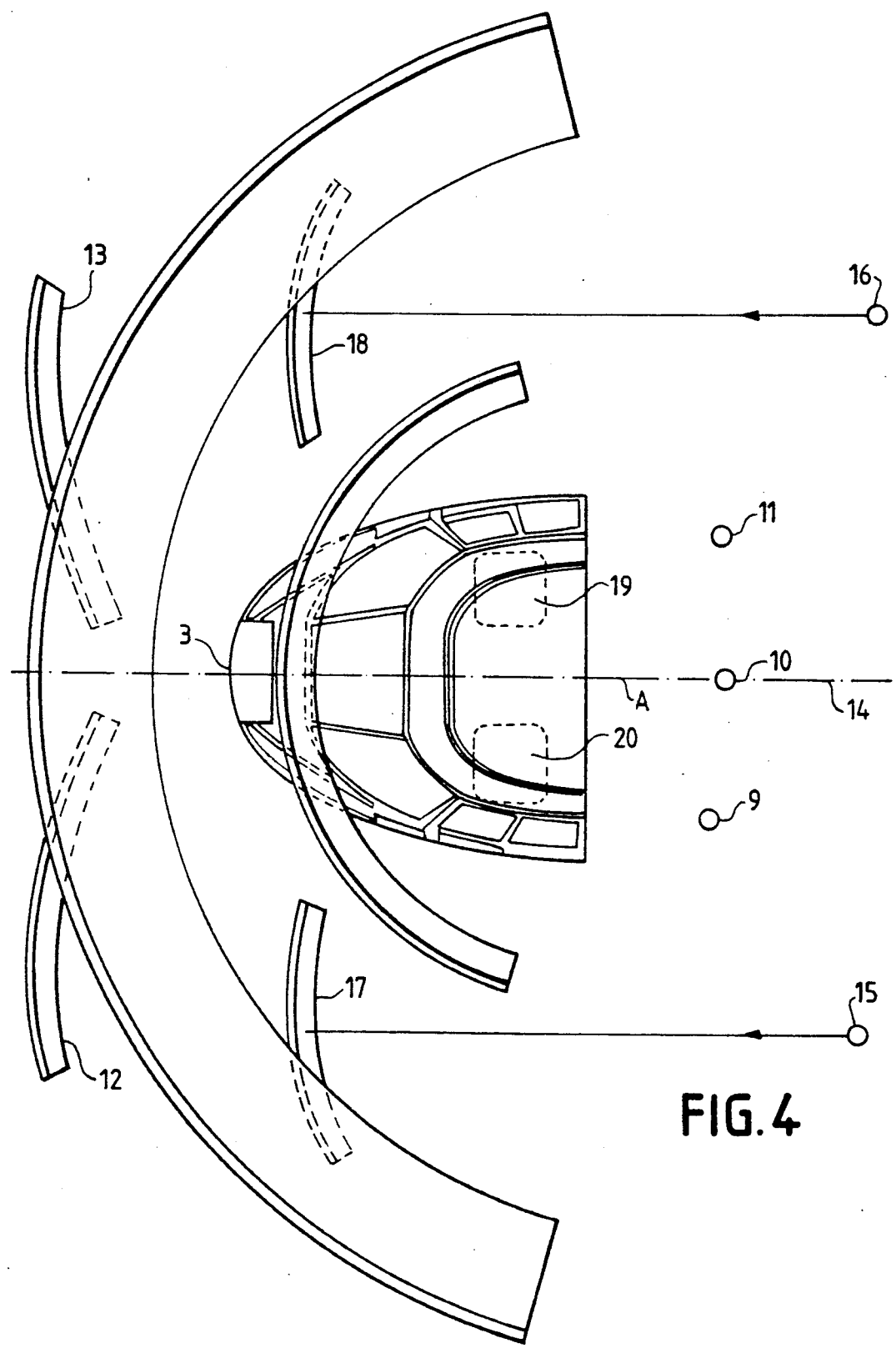
FIG. 4 shows a top view of the system of FIG. 2.

FIGS. 3 and 4 show the projection system according to the invention. This system has an upper mirror 7 similar to the prior art mirror 1. This mirror can advantageously be used to display a horizontal field of about 180° to 225° that can be seen through the upper windows FS of the cockpit.

The mirror 7 is associated with an upper screen 8 similar to the screen 2 of FIGS. 1 and 2, and with three projectors 9, 10, 11 making it possible to obtain a panoramic image of about 180° in the horizontal direction. The screen 8 is above the observers' (pilot's and co-pilot's) eyes.

To display the images liable to be seen through the bottom windows of the cockpit, the invention provides for the positioning (cf. FIGS. 3 and 4), beneath the upper mirror 7, of two lateral lower mirrors 12, 13 that are symmetrical with respect to the longitudinal axis 14 of the cockpit 3 of the simulator. Each of these mirrors 12, 13 is associated with a lateral screen 17, 18 respectively and with a projector 15, 16. The mirrors 12, 13 are spherical mirrors and are positioned so that they can be seen by the pilot and co-pilot through their respective bottom windows. The edges of these mirrors 12, 13 and screens 17, 18 are at about the same horizontal level and slightly above the lower edge of the mirror 7. The mirrors 7, 12, 13 are advantageously rigid, made of glass or of a plastic/foam/plastic sandwich material, thus enabling them to be efficiently joined by means of the sharp edges of mirrors such as this. It will be noted that, for the mirrors 7, 12, 13 to be properly joined to one another, it is necessary, in particular, for the lower edge of the mirror 7 to be a sharp edge, for the mirror 7 masks the upper edge of the mirrors 12 and 13. This means that, with presently used technologies, at least this mirror 7 should be rigid.

The lateral projectors 15, 16 are positioned on either side of the cockpit 14, roughly at the level of the plane passing through the observers' eyes. These projectors are of any appropriate type: based on light valves, liquid crystals or high brilliancy cathode-ray tubes.

What is claimed is:

1. A projection system for cockpit-type simulators, comprising:

a first projection device collimated to infinity with a wide horizontal field, for displaying an upper part of a vertical field, said first projection device including several projectors, a spherical mirror with a wide horizontal field and a screen, said screen also having a wide horizontal field;

a second projection device collimated to infinity for displaying each one of two lower lateral parts of the vertical field, said second projection device including for each of said two lower lateral parts of the vertical field, a lower spherical mirror, a lower lateral screen and a lower projector.

2. A system according to claim 1, wherein the lower projectors are located on each side of a cockpit.

3. A system according to claim 1, wherein at least the spherical mirror having a horizontal wide-field is rigid.

4. A system according to claim 3, wherein at least the spherical mirror having a horizontal wide-field is made of glass.

5. A system according to claim 3, wherein at least the spherical mirror having a horizontal wide-field is made of a plastic/foam/plastic sandwich material.

6. A system according to claim 1, wherein the lower projectors are of the light valve type.

7. A system according to claim 1, wherein the lower projectors are of the liquid crystal type.

8. A system according to claim 1, wherein the lower projectors are of the high brilliancy cathode-ray tube type.

* * * * *